(12) United States Patent
Zhang et al.

(10) Patent No.: US 8,443,302 B2
(45) Date of Patent: May 14, 2013

(54) SYSTEMS AND METHODS OF TOUCHLESS INTERACTION

(75) Inventors: Rui Zhang, Beijing (CN); Yingfei Wu, Beijing (CN); Thomas A. Plocher, Hugo, MN (US)

(73) Assignee: Honeywell International Inc., Morristown, NJ (US)

( * ) Notice: Subject to any disclaimer, the term of this patent is extended or adjusted under 35 U.S.C. 154(b) by 1231 days.

(21) Appl. No.: 12/166,022

(22) Filed: Jul. 1, 2008

(65) Prior Publication Data

US 2010/0005427 A1 Jan. 7, 2010

(51) Int. Cl.
*G06F 3/033* (2006.01)

(52) U.S. Cl.
USPC ............ 715/863; 715/862; 345/158; 345/176

(58) Field of Classification Search .................. 715/863, 715/862; 345/158, 176
See application file for complete search history.

(56) References Cited

U.S. PATENT DOCUMENTS

| | | | |
|---|---|---|---|
| 2004/0183833 A1* | 9/2004 | Chua | 345/773 |
| 2004/0252109 A1* | 12/2004 | Trent et al. | 345/174 |
| 2005/0253807 A1* | 11/2005 | Hohmann et al. | 345/156 |
| 2006/0238517 A1 | 10/2006 | King et al. | |
| 2007/0259717 A1* | 11/2007 | Mattice et al. | 463/36 |
| 2008/0042985 A1* | 2/2008 | Katsuhito et al. | 345/173 |
| 2008/0055259 A1* | 3/2008 | Plocher | 345/173 |
| 2008/0192024 A1* | 8/2008 | Mita | 345/173 |
| 2008/0259053 A1* | 10/2008 | Newton | 345/175 |

FOREIGN PATENT DOCUMENTS

| | | |
|---|---|---|
| CN | 1759369 | 4/2006 |
| GB | 2 421 161 A | 6/2006 |
| JP | 2004-038407 | 2/2004 |

OTHER PUBLICATIONS

English translation of abstract of JP 2004-038407.
3-Axis Capacitive Sensor, Preliminary Technical Data—AD7103; information furnished by Analog Devices, Norwood, MA.
State Intellectual Property Office of the People's Republic of China's Search Report, dated Jun. 26, 2012, corresponding to Application No. 200910163965.1.

* cited by examiner

*Primary Examiner* — William Bashore
*Assistant Examiner* — Gregory A Distefano
(74) *Attorney, Agent, or Firm* — Husch Blackwell LLP (57) ABSTRACT

A contactless display system enables a user to interact with a displayed image by moving a finger, or pointer, toward a selected portion of the image. Images can be enlarged, or translated dynamically in response to detected movement. Operational methodology can be manually switched between contact-type and contactless operation to enhance flexibility.

18 Claims, 14 Drawing Sheets

SYSTEMS AND METHODS OF TOUCHLESS INTERACTION

FIELD

The invention pertains to systems and methods to navigate small screen displays. More particularly, the invention pertains to such systems and methods with contactless sensors for tracking a trajectory of a user's finger toward a virtual keyboard.

BACKGROUND

Various types of small screen displays can be found on products such as cellular telephones, personal digital assistants (PDAs), mobile computers and imagers. Increasingly, users must navigate small screen displays to do web browsing with a mobile phone or photo browsing using a PDA.

Small touch screens are popular to support interaction with applications running on portable devices, such as PDAs and mobile phones. Small touch screens also are finding their way into home products such as the Honeywell TH8321U1006 thermostat, the Honeywell 6271V security panel, and various personal health monitoring devices. They have been used for years in parcel delivery, retail warehouse operations, and refinery field operations.

Navigation schemes using zooming and panning controls or by a fish-eye viewer are known. However, these controls are inconvenient or are inefficient to use them in some situations. For example, it is hard to use fish-eye navigation with a touch screen. It is also hard to zoom and pan graphics with a mouse or a touch screen. Navigation with a stylus on a small screen is perhaps even more difficult for the user.

There is thus a continuing need for alternative approaches to control navigating large and small scale graphics that is natural and easier to use.

It would also be desirable to be able to use such approaches in navigating large scale graphics such as maps or building floor plans.

DETAILED DESCRIPTION

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the invention incorporate a touchless, or contactless, interface, one that senses the position of a user's finger or hand in three dimensions. In a disclosed embodiment, a plurality of capacitive sensors can be arranged at the edges of a display device. The trajectory of the finger or hand can be tracked toward a point on a virtual keyboard being displayed on the device. This enables the associated system to anticipate the point on the screen of the display device that the user is attempting to select, before the finger actually touches the screen.

Z-axis finger position data can be used, in accordance with the invention, to control the zoom ratio or zoom range on, for example, a map display. Alternately, a fish eye on a map display can be controlled with this touchless pointing approach. Multiple parameters of the fish eye can be modified during the process, such as zoom ratio, zoom range, zoom shape (rectangle, round rectangle, ellipse, etc.), and proportion of the distorted edge around the fisheye.

As the user moves his/her finger, the graphical content in the display is updated accordingly. Finger movement can also control zooming/spanning operation or fish-eye effect on the map display. This process should be highly efficient and intuitive for users.

The same approach can also be used to control and interact with a virtual keyboard on a small screen display. It overcomes the chronic problem associated with small virtual keyboards in that the keys are always much smaller than the human finger tip.

Precise interaction requires magnification of only the target region of the keyboard (e.g. some small subset of the keys). The touchless interface uses z-axis data pertaining to hand position to infer the desired target region on the keyboard and automatically zooms in or magnifies the desired region on the virtual keyboard.

In some applications, the input signal from the touchless device might disturb interactions which don't need to be touchless. In an aspect of the invention, several different approaches can be used to intuitively and quickly disable/enable the touchless interaction. In one embodiment, the user's right hand can be used for pointing and controlling the zoom control or fish eye control and the left hand can be used to operate a button that enables or disables the touchless navigation. In this process, the left hand also can be used to quickly change fisheye or zoom parameters on the fly simultaneous with the right hand doing the pointing and dragging to provide a very efficient two-handed interaction.

Figure 1:
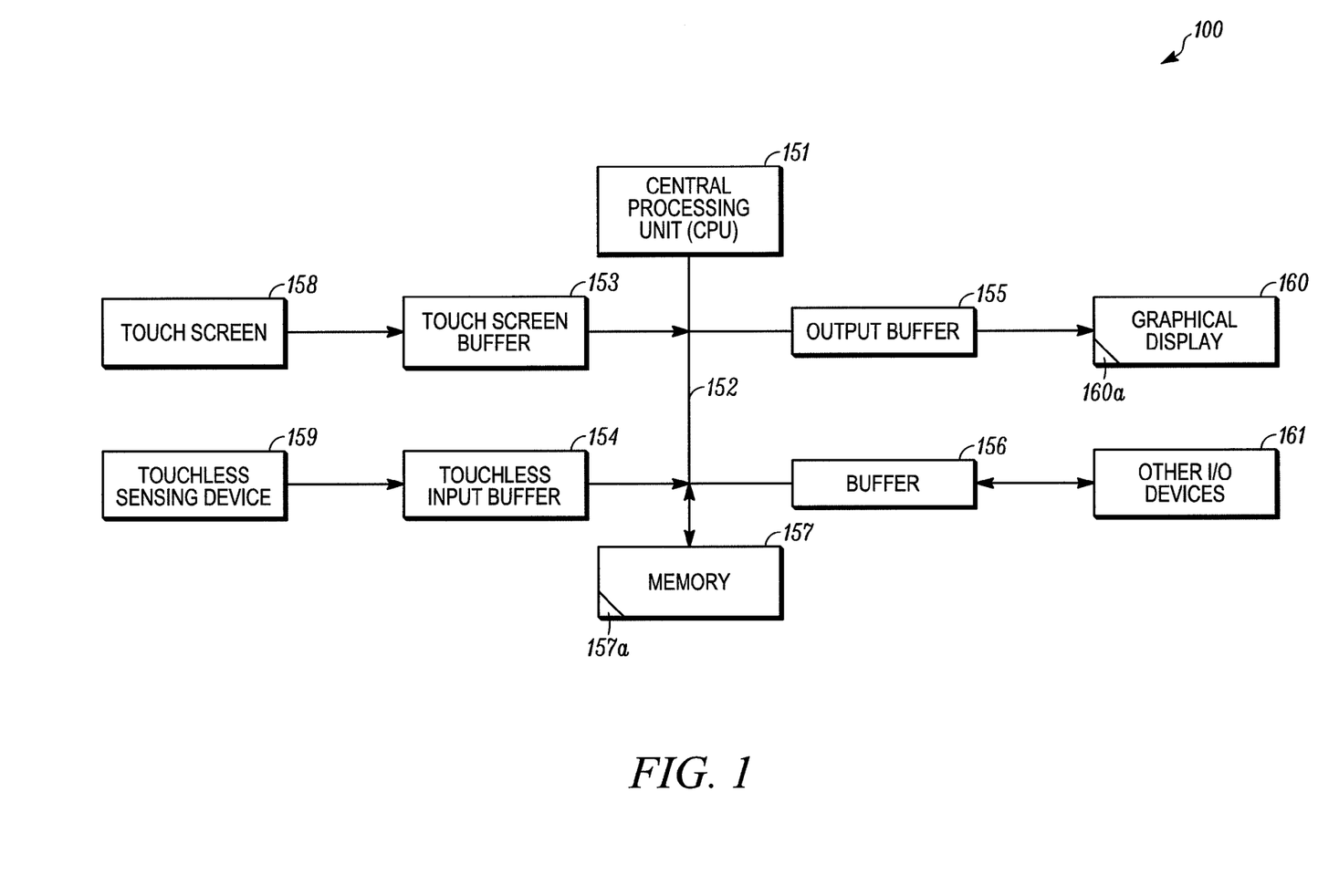
FIG. 1 is a diagram of a touchless interaction system in accordance with the invention.

FIG. 1 illustrates a touchless, or contactless interaction system 100. The system 100 includes a programmable processing unit 151 connected over data bus 152 with touch screen input buffer 153, touchless input buffer 154, display buffer 155, buffer 156 and storage unit, or, memory 157. Touch screen 158 is coupled to the processor through touch screen buffer 153. Touchless sensing device 159, for example a plurality of capacitive based non-contact sensors, is coupled to the processor through touchless input buffer 154.

Graphical display 160 is coupled to the processor through display buffer 155. Display device 160 includes a display screen upon which various images are presented. The touchless sensors 159 are located around the periphery of the display screen of the display device 160 as discussed in more detail subsequently.

I/O devices 161 are coupled to the processor through I/O buffer 156. I/O devices may include any combination of devices allowing the system to interact with external information.

Storage unit 157 contains the information and/or programs or executable software necessary for the processor 151 to implement a touchless interaction system. For example, display control software 157a can be stored in a computer readable form in unit 157. Other system control software can also be stored in unit 157.

Figure 2:
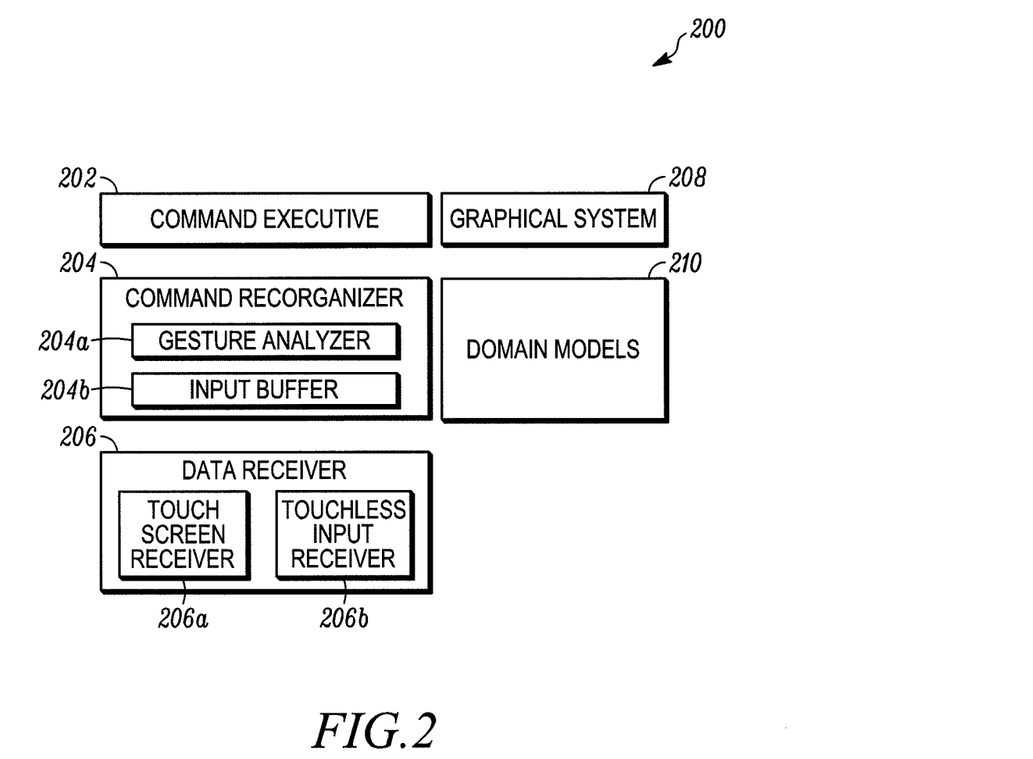
FIG. 2 is a block diagram of some of the software element of the system of FIG. 1.

FIG. 2 illustrates various software modules 200 of the system 100 which are executed by the processor 151. Modules 200 can be stored in unit 157 in magnetic or optical computer readable form. Software 200 includes a Command Executive module 202, a Command Recognizer module 204, a Data Receiver 206, a Graphical System Display module 208 and Domain Models 210 which provide information as to the region being displayed. Operation of various modules is discussed relative to the process 250 of FIG. 3.

Figure 3:
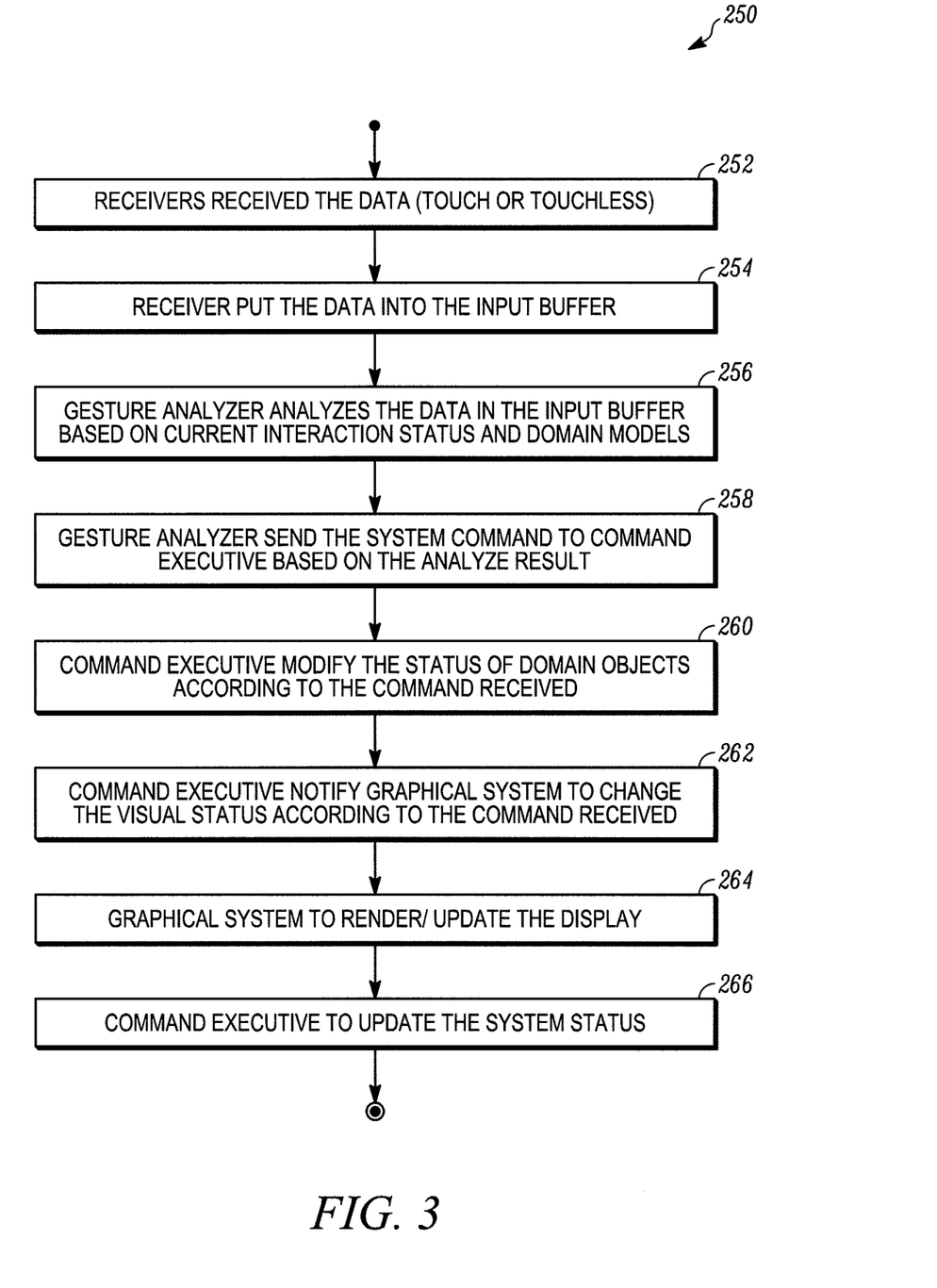
FIG. 3 is a flow diagram illustrating a method of interaction.

As illustrated in the flow diagram of FIG. 3, data from the sensors, such as sensors 158, or 159 is loaded into respective receivers such as 206a, b from buffers 153, 154, as at 252. That data is loaded into input buffer 204b as at 254.

Gesture Analyzer 204a analyzes the data as at 256. The Gesture Analyzer 204a sends a system command to the Command Executive 202 as at 258. The Command Executive modifies the status of Domain Objects, of the Models 210 as at 260.

The Command Executive 202 notifies the Graphical System module 208 to alter the status of the visual image on the display 160, as at 262. The Graphical system module 208 updates the image on the display unit 160, as at 264. The Command Executive module 202 then updates the system status, as at 266.

Figure 4A:
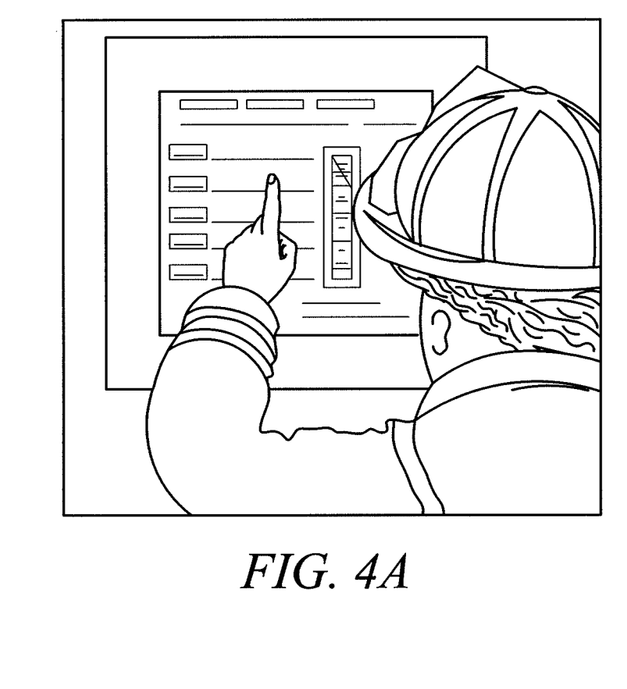
FIG. 4A, B illustrate two different applications of the system of FIG. 1.
Figure 4B:
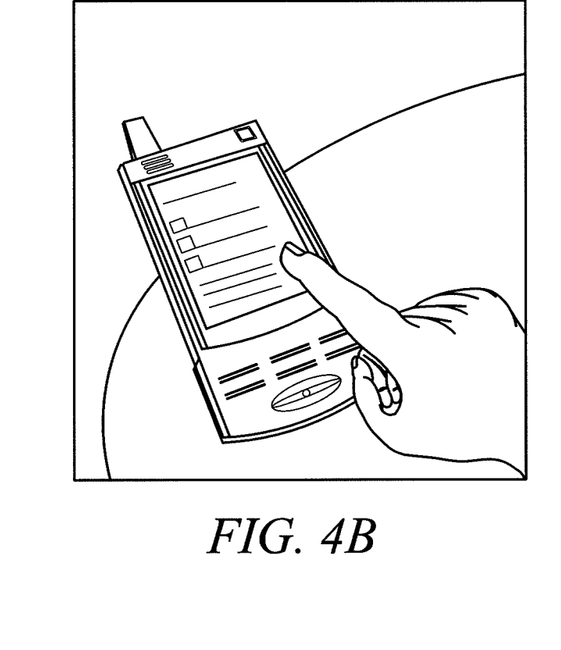

FIG. 4A illustrates one embodiment of the invention, a contactless, navigational regional display such as might be used to evaluate an alarm condition of a building. In a second embodiment, FIG. 4B illustrates small display contactless navigation in accordance with the invention.

Figure 5:
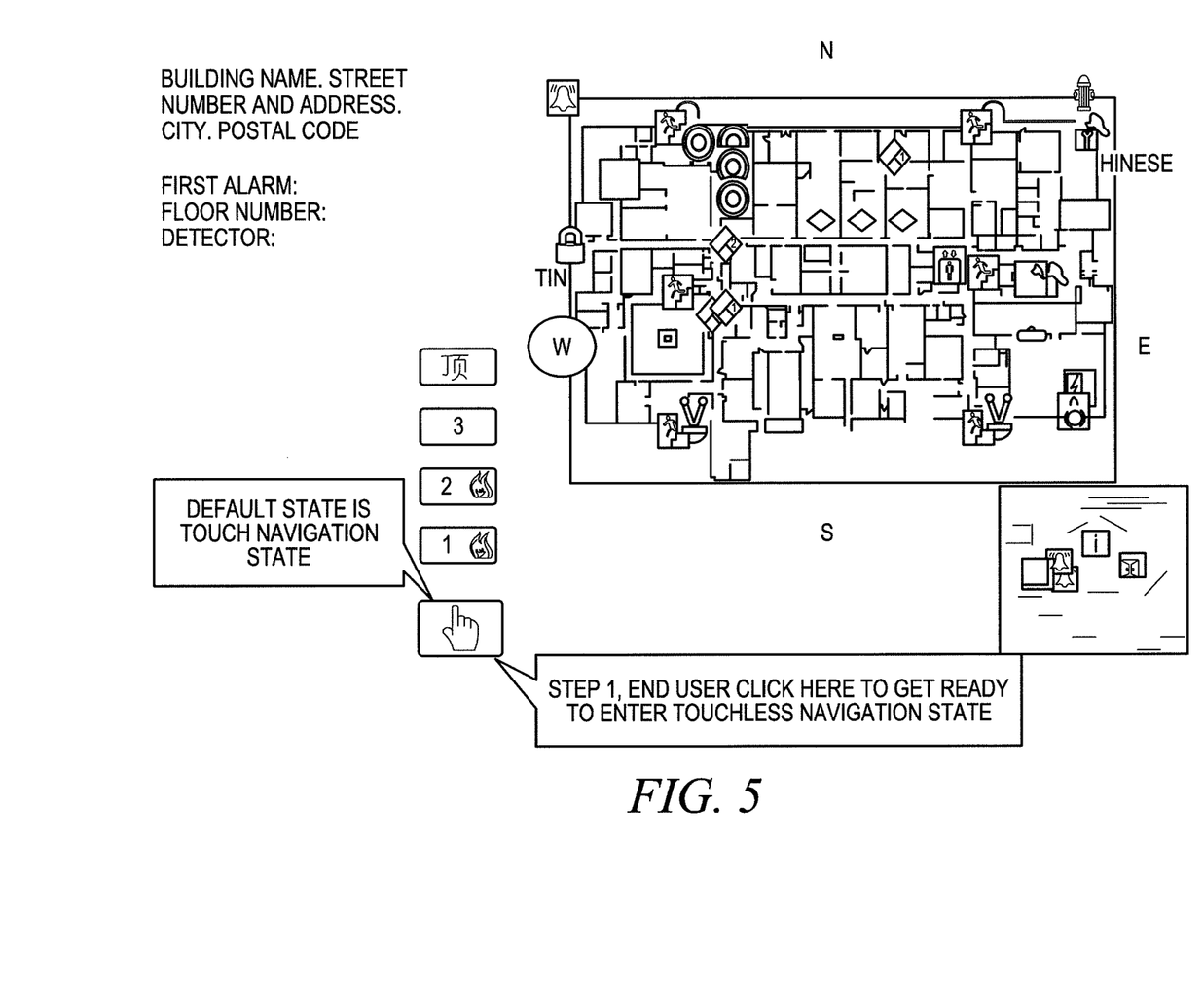
FIG. 5 is a touchless mode entry screen.
Figure 6:
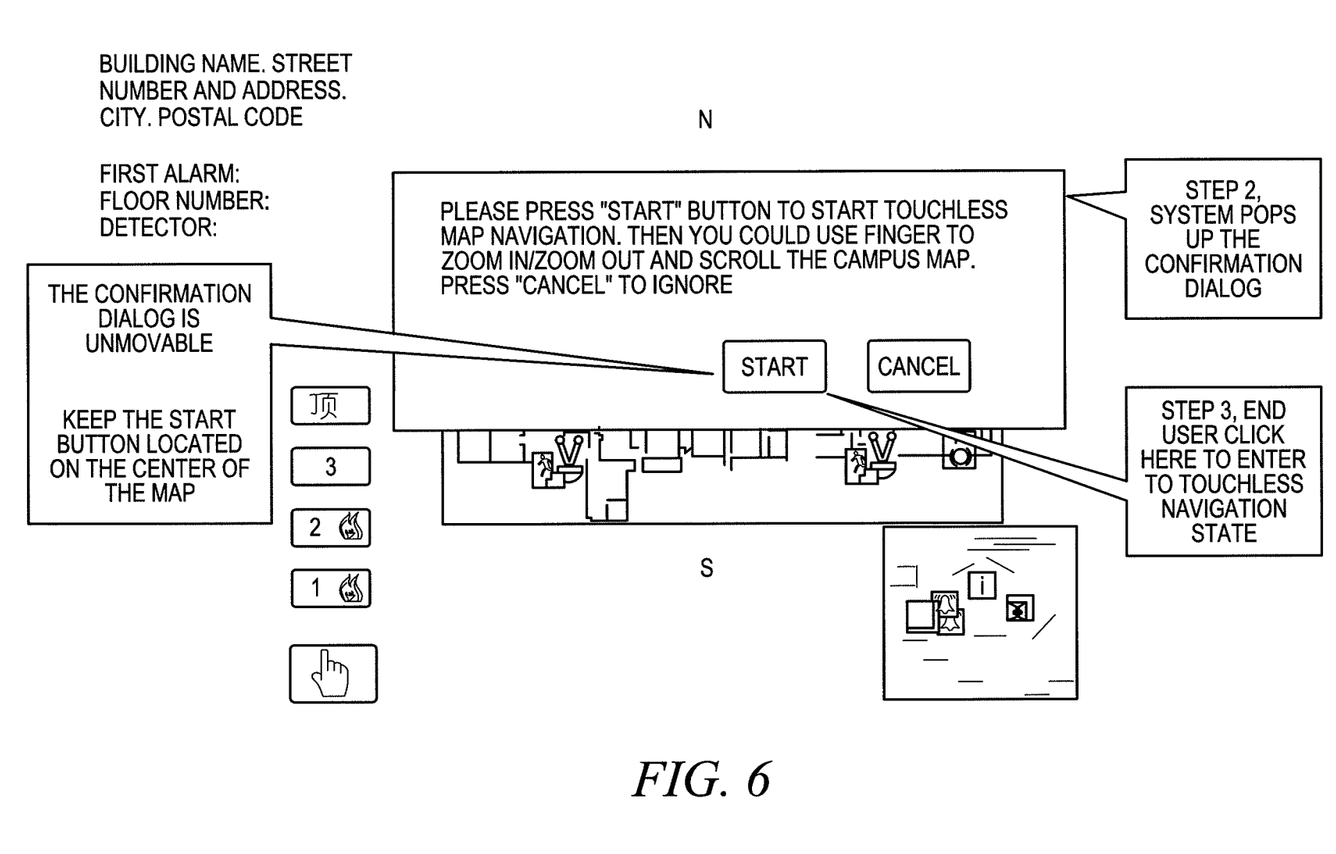
FIG. 6 is an intermediate touchless mode screen.
Figure 7:
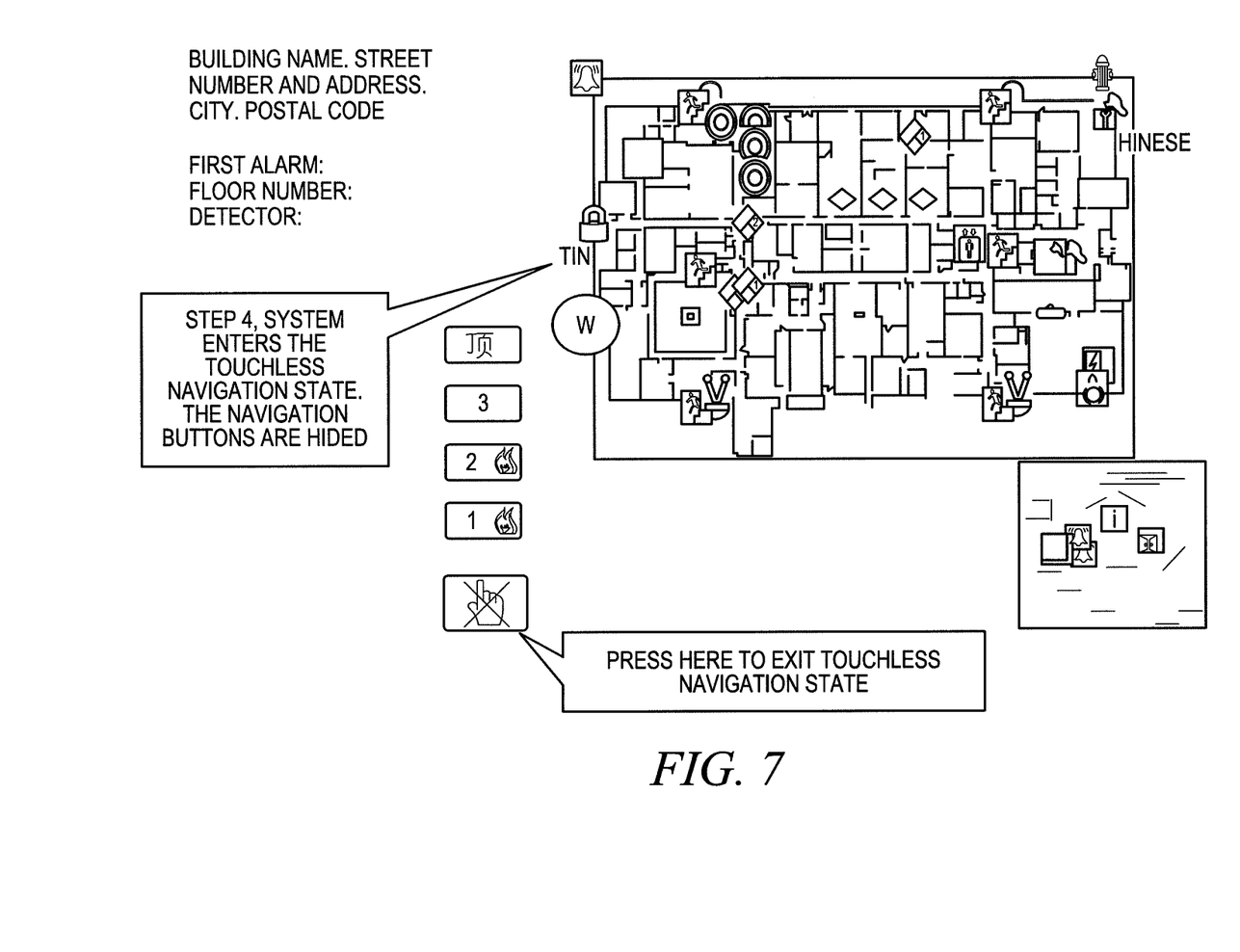
FIG. 7 is a touchless mode regional display screen with an exit button.

FIG. 5 illustrates a display of the type of the embodiment, or application, of FIG. 4a in an initial display state. In Step 1, as indicated, a User can click on a button to enter a touchless navigation state. FIG. 6 is a confirmation screen presented to the User on the display unit 160. The User can enter the touchless navigation state as illustrated at Step 3. FIG. 7 illustrates a screen present on the display unit 160 when in the touchless navigation state. A button is provided to exit the touchless state.

Figure 8A:
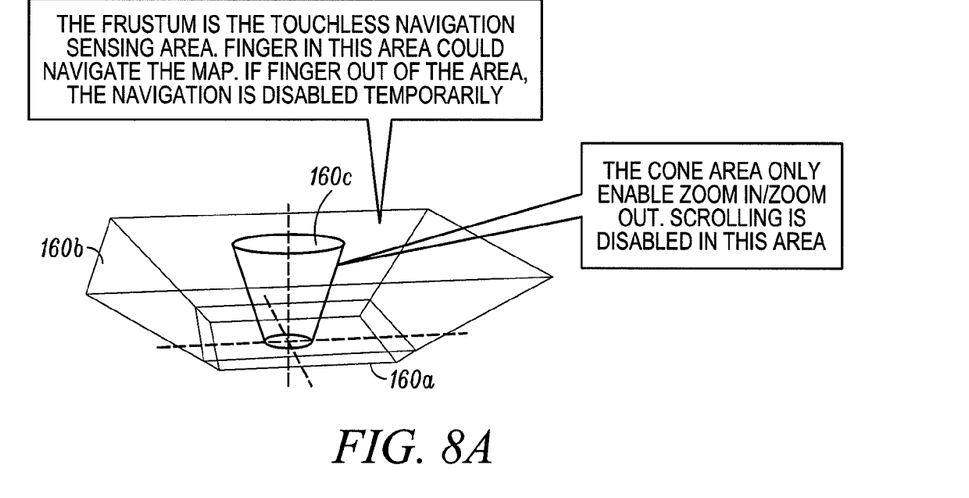
FIGS. 8A, B, C illustrate various aspects of the contactless sensors of the system of FIG. 1.
Figure 8B:
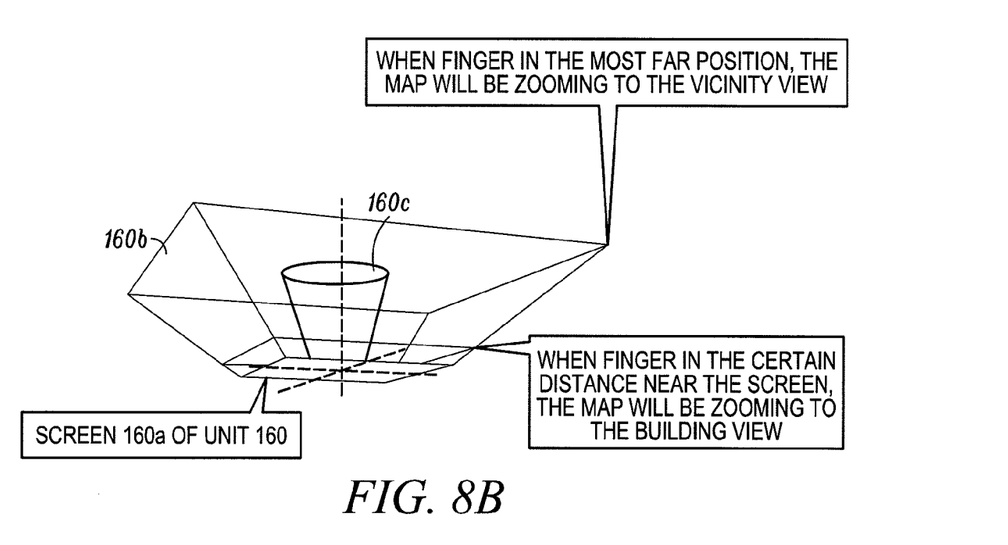
Figure 8C:
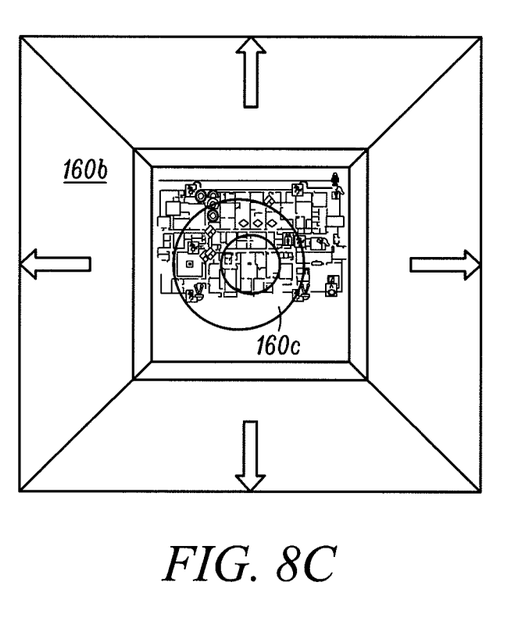

FIGS. 8A, B, C illustrate various aspects of the characteristics of the contactless sensors 159 arranged about the perimeter of the screen 160a of the display unit 160. As illustrated therein, sensors 159 define an outer frusto-conical sensing region 160b and an inner region 160c.

When the User's finger or pointing device is in the outer region 160b, the regional display or map can be navigated or scrolled as well as zoomed. As the User's finger approaches the screen, in the region 160b, and 160c, the presented image zooms from one level to a to a more detailed level, for example. When the User's finger enters the interior region 160c the User can, in one embodiment, only zoom in and out on the map or display. The region 160c could help the end user zoom in/out of the map or display smoothly without dithering or jittering.

Figure 9A:
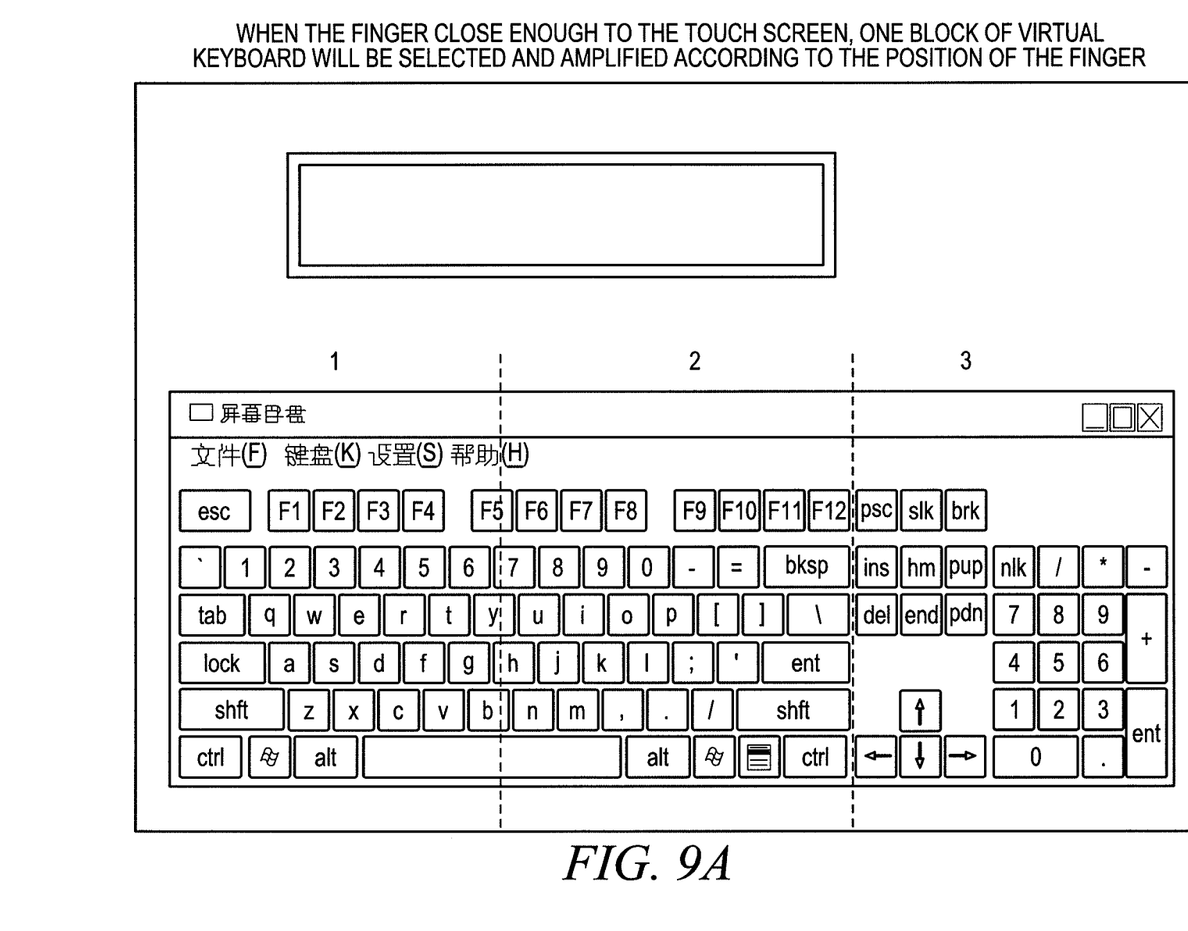
FIGS. 9A, B, C illustrate one form of virtual keyboard touchless navigation.
Figure 9B:
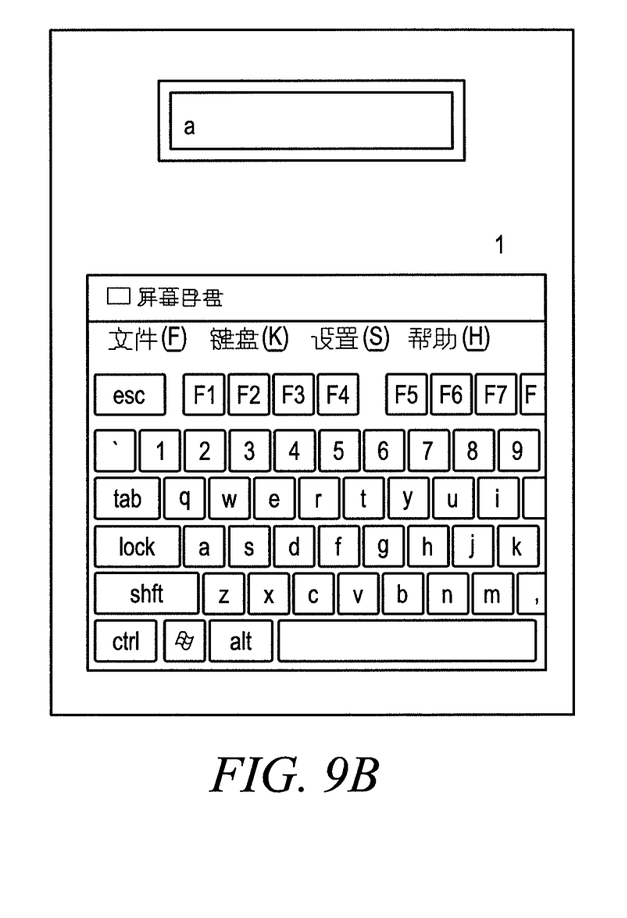
Figure 9C:
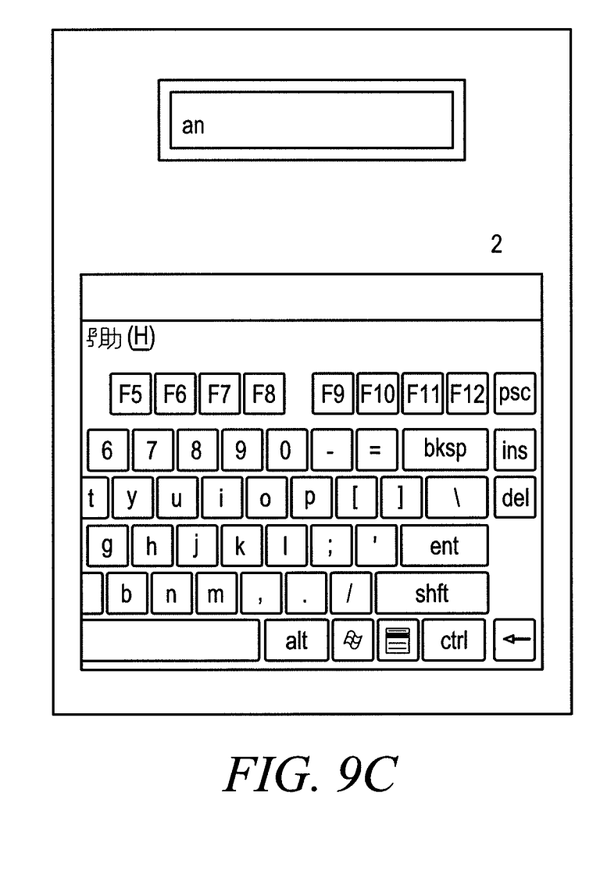

FIGS. 9A, B, C illustrate steps of one solution to navigating virtual keyboards using the system 100. A region can be selected and enlarged by the User to activate a key. Then, a second region can be selected and enlarged by the User to activate a different key, and so on until the desired entry has been completed.

Figure 10A:
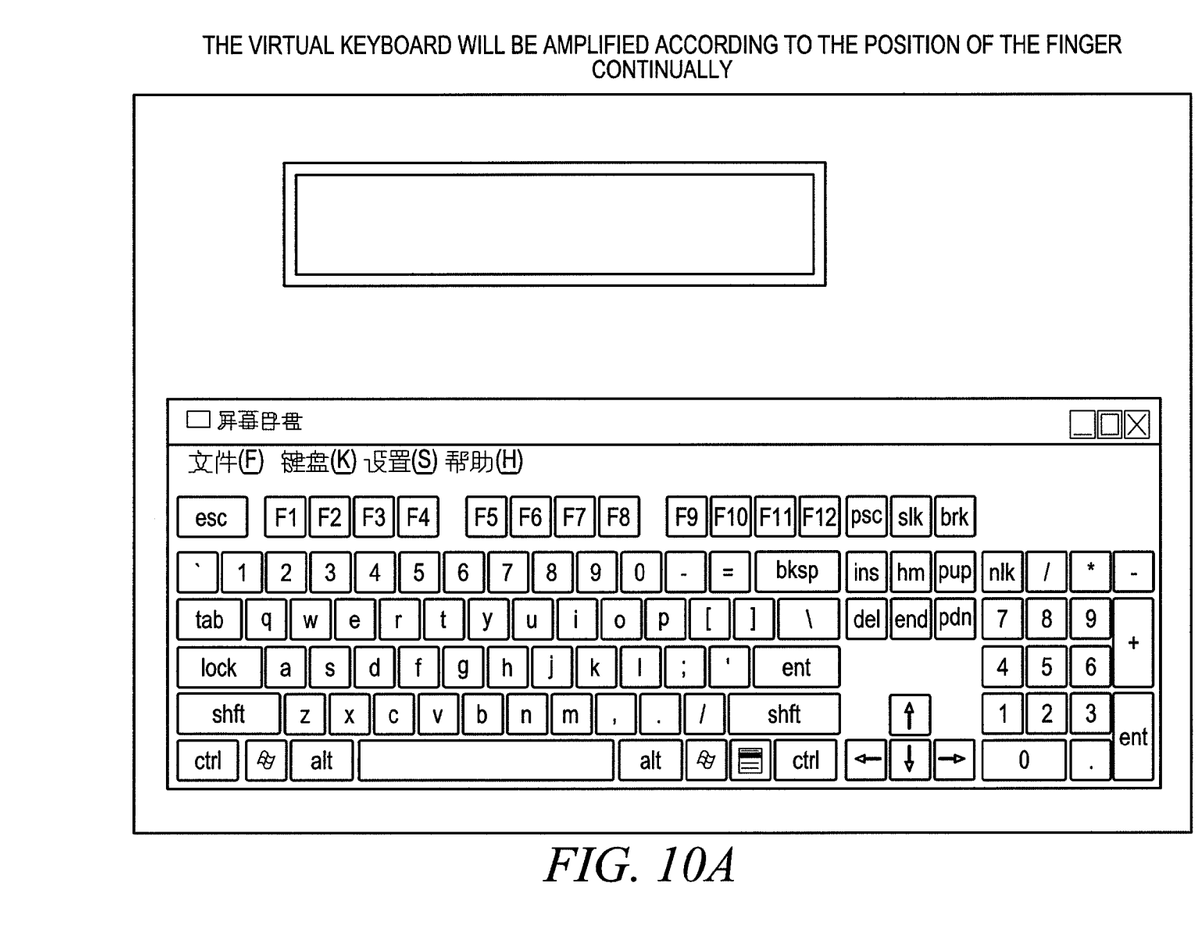
FIGS. 10A, B, C illustrate another form of virtual keyboard touchless navigation.
Figure 10B:
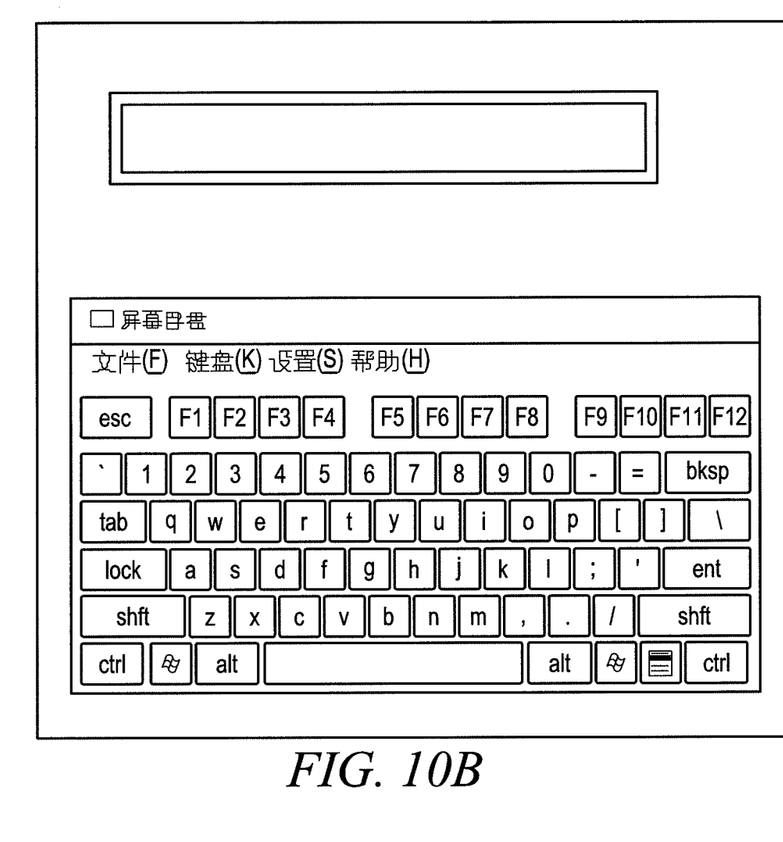
Figure 10C:
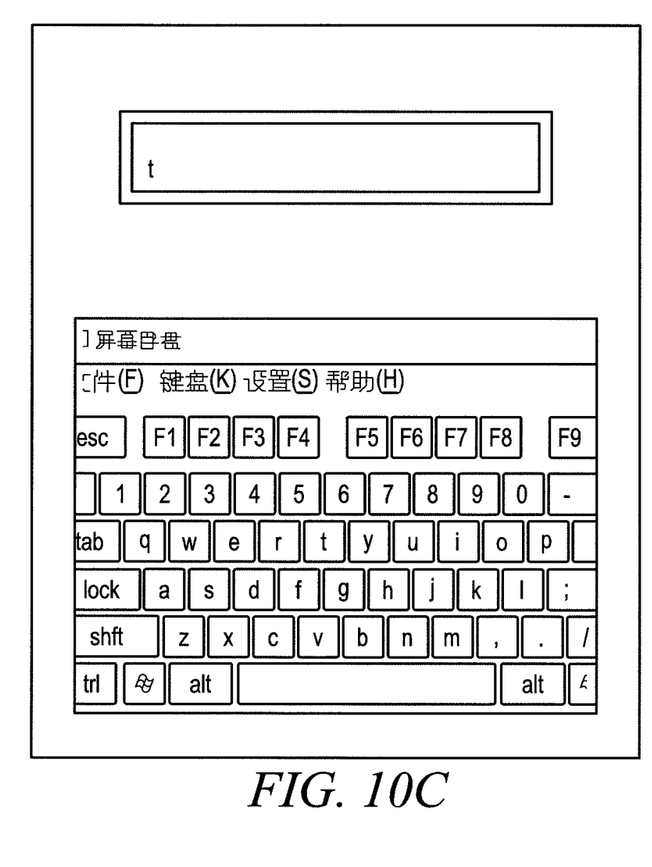

FIGS. 10A, B, and C illustrate steps of another solution to navigating virtual keyboards using the system 100. In the embodiment of FIGS. 1A, B, and C, any portion of the keyboard to which the User's finger moves can be magnified or enlarged to enable the User to seamlessly activate a sequential group of keys. It will be understood that embodiments of the present invention can be incorporated into electronic devices such as wireless phones, mobile computers, or imaging devices, all without limitation which might have relatively small keyboards.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A display system comprising:
   a multi-dimensional display device with a surface on which an image can be presented;
   a plurality of contactless sensors positioned adjacent to the surface; and
   control circuits coupled to the sensors and the display device,
   wherein the control circuits establish a first sensing region adjacent to the surface of the display device, the first sensing region having a predetermined shape, and, a second sensing region within the first sensing region, the second sensing region having a different shape than the first sensing region,
   wherein the control circuits, responsive to signals from the sensors, determine a trajectory of a pointing member in the first sensing region moving toward the surface, and, responsive thereto, vary the image on the surface, and
   wherein the control circuits, responsive to signals from the sensors, determine a trajectory of a pointing member in the second sensing region moving toward the surface, and, responsive thereto, vary the image on the surface differently than when the pointing member is in the first sensing region and not the second sensing region.

2. A system as in claim 1 which includes display control circuitry, coupled to the control circuits, the display control circuitry, responsive to the determined trajectory, dynamically adjusts a magnification parameter of an image presented on the surface.

3. A system as in claim 1 where the sensors comprise capacitive-type sensors.

4. A system as in claim 1 where the sensors are configured to define a frusto-conical region in which the pointing member can be sensed.

5. A system as in claim 1 which includes a manually operable element, coupled to the control circuits, that switches between a contactless and a contact-type mode of interaction with the image on the surface.

6. A system as in claim 1 where the control circuits respond to a selected one of a contact-type, or a contactless mode of interaction with the image on the surface.

7. A system as in claim 1 which includes a plurality of contact-type sensors associated with the screen of the display device.

8. A system as in claim 1 which includes display management software stored on a computer readable medium, coupled to the control circuits.

9. A system as in claim 8 where the display management software, when executed by the control circuits, presents a dynamically changing image on the surface of the display unit in response to the determined trajectory of the pointing member.

10. A system as in claim 9 where the dynamically changing image on the surface includes at least one of enlarging the image, shrinking the image, or translating the image.

11. A system as in claim 10 where the display management software presents on the surface an enlargeable virtual keyboard.

12. A system as in claim 11 where the control circuits respond to a selected key of the virtual keyboard, and the display management software presents the select key on the surface of the display device.

13. A system as in claim 1 where the first sensing region includes a first frusto-conical-type sensing region, and the second sensing region includes a second interior frusto-conical-type sensing region.

14. A process comprising:
providing a display surface;
establishing a first sensing region having a first multi-dimensional shape;
establishing a second sensing region within the first sensing region, the second sensing region having a different shape then the first sensing region;
sensing movement of an elongated member in the first sensing region, and, responsive thereto, varying a display on the surface; and
sensing movement of the elongated member in the second sensing region, and, responsive thereto, varying the display on the surface differently than when the elongated member is in the first sensing region and not the second sensing region.

15. A process as in claim 14 where the first multi-dimensional shape comprises a frustum.

16. A process as in claim 14 where the shape of the second sensing region comprises a portion of a cone.

17. A process as in claim 14 which includes providing a plurality of images which can be displayed on the surface, and, sequentially scrolling through those images when the member is in the first sensing region.

18. A process as in claim 17 which includes providing a zoom function, relative to a displayed image, when the member is in the second sensing region.

* * * * *